US010202114B2

(12) United States Patent
Lian et al.

(10) Patent No.: US 10,202,114 B2
(45) Date of Patent: Feb. 12, 2019

(54) ELECTRIC VEHICLE AND ACTIVE SAFETY CONTROL SYSTEM AND METHOD THEREOF

(71) Applicant: BYD COMPANY LIMITED, Shenzhen, Guangdong (CN)

(72) Inventors: Yubo Lian, Shenzhen (CN); Hongbin Luo, Shenzhen (CN); Jintao Zhang, Shenzhen (CN); Dongsheng Yang, Shenzhen (CN)

(73) Assignee: BYD COMPANY LIMITED (CN)

( * ) Notice: Subject to any disclaimer, the term of this patent is extended or adjusted under 35 U.S.C. 154(b) by 0 days.

(21) Appl. No.: 15/767,869

(22) PCT Filed: Oct. 26, 2016

(86) PCT No.: PCT/CN2016/103413
§ 371 (c)(1),
(2) Date: Apr. 12, 2018

(87) PCT Pub. No.: WO2017/071590
PCT Pub. Date: May 4, 2017

(65) Prior Publication Data
US 2018/0297585 A1    Oct. 18, 2018

(30) Foreign Application Priority Data
Oct. 26, 2015  (CN) .......................... 2015 1 0702999

(51) Int. Cl.
*B60W 30/02*    (2012.01)
*B60L 15/20*    (2006.01)
(Continued)

(52) U.S. Cl.
CPC ............. *B60W 30/02* (2013.01); *B60L 3/102* (2013.01); *B60L 7/18* (2013.01); *B60L 7/26* (2013.01);
(Continued)

(58) Field of Classification Search
CPC .... B60W 30/02; B60W 10/08; B60W 10/188; B60W 40/101; B60W 40/114;
(Continued)

(56) References Cited

U.S. PATENT DOCUMENTS 5,318,355 A    6/1994  Asanuma et al.
5,524,079 A *  6/1996  Ishida ................... B62D 7/159
                                                    180/412
(Continued)

FOREIGN PATENT DOCUMENTS

CN    101767535 A    7/2010
CN    102975702 A    3/2013
(Continued)

OTHER PUBLICATIONS

International Search Report from PCT/CN2016/103413 dated Jan. 26, 2017 (4 pages).

*Primary Examiner* — Marthe Y Marc-Coleman
(74) *Attorney, Agent, or Firm* — Calfee, Halter & Griswold LLP

(57) ABSTRACT

The present disclosure discloses an electric vehicle and an active safety control system and method thereof. The system includes: a wheel speed detection module configured to detect a wheel speed to generate a wheel speed signal; a steering wheel rotation angle sensor and a yaw rate sensor module, configured to detect state information of the electric vehicle; a motor controller; and an active safety controller configured to receive the wheel speed signal and state information, obtain state information of a battery pack and state information of four motors, obtain a first side slip signal or a second side slip signal according to the wheel speed signal, the state information, the battery pack and the four motors, and according to the first side slip signal or the second side slip signal, control four hydraulic brakes of the (Continued)

electric vehicle and control the four motors by using the motor controller.

20 Claims, 6 Drawing Sheets

(51) Int. Cl.
| | |
|---|---|
| *B60L 3/10* | (2006.01) |
| *B60T 8/1755* | (2006.01) |
| *B60W 10/08* | (2006.01) |
| *B60W 10/188* | (2012.01) |
| *B60W 40/101* | (2012.01) |
| *B60W 40/114* | (2012.01) |
| *B60L 7/18* | (2006.01) |
| *B60L 7/26* | (2006.01) |

(52) U.S. Cl.
CPC ........ *B60L 15/2009* (2013.01); *B60T 8/1755* (2013.01); *B60T 8/17552* (2013.01); *B60W 10/08* (2013.01); *B60W 10/188* (2013.01); *B60W 40/101* (2013.01); *B60W 40/114* (2013.01); *B60L 2220/46* (2013.01); *B60L 2240/22* (2013.01); *B60L 2240/24* (2013.01); *B60L 2240/423* (2013.01); *B60L 2240/461* (2013.01); *B60L 2240/465* (2013.01); *B60T 2230/02* (2013.01); *B60T 2250/03* (2013.01); *B60T 2270/86* (2013.01); *B60W 2520/125* (2013.01); *B60W 2520/14* (2013.01); *B60W 2520/20* (2013.01); *B60W 2520/26* (2013.01); *B60W 2520/28* (2013.01); *B60W 2710/08* (2013.01); *B60W 2710/083* (2013.01); *B60W 2710/18* (2013.01); *Y02T 10/7258* (2013.01)

(58) Field of Classification Search
CPC ....... B60W 2520/125; B60W 2520/14; B60W 2520/20; B60W 2520/26; B60W 2525/28; B60W 2710/08; B60W 2710/083; B60W 2710/18; B60L 3/102; B60L 15/2009; B60L 2220/46; B60L 2240/22; B60L 2240/24; B60L 2240/423; B60L 2240/461; B60L 2240/465; B60T 8/17552; B60T 2230/02; B60T 2250/03; B60T 2270/86
USPC .......................................................... 701/22
See application file for complete search history.

(56) References Cited

U.S. PATENT DOCUMENTS

| 5,895,100 A | 4/1999 | Ito et al. | |
|---|---|---|---|
| 2010/0268408 A1 | 10/2010 | Yuki | |
| 2015/0191159 A1* | 7/2015 | Akamine | B60T 8/1755 701/22 |
| 2015/0224970 A1* | 8/2015 | Yasui | B60T 8/17616 701/74 |

FOREIGN PATENT DOCUMENTS

| CN | 103223936 A | 7/2013 |
|---|---|---|
| CN | 204077392 U | 1/2015 |
| JP | 5161213 A | 8/2010 |
| JP | 2011061957 A | 3/2011 |
| JP | 2013110875 A | 6/2013 |

* cited by examiner

US 10,202,114 B2

ELECTRIC VEHICLE AND ACTIVE SAFETY CONTROL SYSTEM AND METHOD THEREOF

CROSS-REFERENCE TO RELATED APPLICATION

This application is based upon International Application No. PCT/CN2016/103413, filed on Oct. 26, 2016, which claims priority to and benefits of Chinese Patent Application Serial No. 201510702999.9, filed with the State Intellectual Property Office of P. R. China on Oct. 26, 2015, the entire content of which are incorporated herein by reference.

TECHNICAL FIELD

The present disclosure relates to the technical field of electric vehicles, and more particularly, to an active safety control system of an electric vehicle, an active safety control method of an electric vehicle, and an electric vehicle.

BACKGROUND

An electronic stability program (ESP) is an electric vehicle control system that can help a driver keep a vehicle stable in a limited working condition. The ESP usually consists of a sensor system (including a steering wheel rotation angle sensor, a yaw angular speed sensor, a lateral acceleration sensor, and a wheel speed sensor), a hydraulic actuation system, and an electronic control unit (ECU). A basic principle of the ESP is to implement, according to a manipulation intention of a driver, vertical dynamics control (indirect lateral force control) on an automobile that is in a critical stable state, so as to prevent the vehicle from entering an uncontrollable and unstable state, and at the same time also ensure that a manipulation characteristic of the vehicle in a limited working condition is consistent with that in a working condition in a linear region of routine driving, so that the driver can operate the vehicle according to previous driving experience in a linear region, thereby achieving an objective of controlling the vehicle.

Currently, on a conventional vehicle, a hydraulic braking system is indispensable. Therefore, an ESP on a current vehicle implements stable control of the vehicle based on hydraulic braking. However, the hydraulic braking system is relatively complex, and has a relatively slow response, which affects driving safety of the vehicle.

SUMMARY

An objective of the present disclosure is to at least resolve one of the foregoing technical disadvantages.

Accordingly, a first objective of the present disclosure is to provide an active safety control system of an electric vehicle, so as to resolve a dynamic control problem of a vehicle body of an all-wheel drive electric vehicle and a problem of a slow response speed that exists in a hydraulic electronic stability control system, so that operational stability and safety of a vehicle may be greatly improved.

A second objective of the present disclosure is to provide an electric vehicle. A third objective of the present disclosure is to provide an active safety control method of an electric vehicle.

To achieve the foregoing objectives, an embodiment of a first aspect of the present disclosure provides an active safety control system of an electric vehicle, including: a wheel speed detection module, configured to detect a wheel speed of the electric vehicle to generate a wheel speed signal; a steering wheel rotation angle sensor and a yaw rate sensor module, configured to detect state information of the electric vehicle; a motor controller, configured to connect to four motors of the electric vehicle, respectively; and an active safety controller, configured to communicate with the motor controller mutually, communicate with the steering wheel rotation angle sensor and the yaw rate sensor module, connected to each hydraulic brake of the electric vehicle, and receive the wheel speed signal sent by the wheel speed detection module and the state information of the electric vehicle sent by the steering wheel rotation angle sensor and the yaw rate sensor module; obtain state information of a battery pack of the electric vehicle and state information of the four motors; obtain a first side slip signal or a second side slip signal according to the wheel speed signal, the state information of the electric vehicle, the state information of the battery pack, and the state information of the four motors; according to the first side slip signal or the second side slip signal, control the four hydraulic brakes and control the four motors by using the motor controller, in which the first side slip signal indicates that the electric vehicle has a side slip and is about to enter a side slip limit interval, and the second side slip signal indicates that the electric vehicle is in the side slip limit interval.

For the active safety control system of an electric vehicle according to this embodiment of the present disclosure, when an electric vehicle has a side slip and is about to enter a side slip limit interval, yaw control is performed on the electric vehicle by using driving torques of four motors, so that an attitude of the electric vehicle is corrected, a turning speed of the electric vehicle is improved, a decrease in a vehicle speed caused by braking is avoided, and operational stability of the electric vehicle is improved. When the electric vehicle is in the side slip limit interval, yaw control is performed on the electric vehicle by using the driving torques and feedback braking torques of the four motors and using braking torques of the four hydraulic brakes simultaneously, so that the electric vehicle enters a stable state more rapidly, and safety of the electric vehicle is improved. When the motors have a limited feedback braking capability, combined control of braking torques of the hydraulic brakes and feedback braking torques of the motors may be used to rapidly perform compensation of hydraulic braking torques, thereby implementing a combined control function of an active safety controller, and expanding an application scope of the system.

To achieve the foregoing objectives, an embodiment of a second aspect of the present disclosure provides an electric vehicle, including the foregoing active safety control system of an electric vehicle.

For the electric vehicle according to this embodiment of the present disclosure, when a side slip occurs and the electric vehicle is about to enter a side slip limit interval, yaw control is performed by using the driving torques of the four motors, so that an attitude of the electric vehicle is corrected, a turning speed of the electric vehicle is improved, a decrease in a vehicle speed caused by braking is avoided, and operational stability is improved. When the electric vehicle is in the side slip limit interval, yaw control is performed by using the driving torques and feedback braking torques of the four motors and using braking torques of four hydraulic brakes simultaneously, so that the electric vehicle enters a stable state more rapidly, thereby improving safety. Moreover, when the motors have a limited feedback braking capability, combined control of braking torques of the hydraulic brakes and feedback braking torques of the motors may be used to rapidly perform compensation of hydraulic braking torques, thereby implementing a combined control function of an active safety controller, and having a wide application scope, and higher safety.

To achieve the foregoing objectives, an embodiment of a third aspect of the present disclosure provides an active safety control method of an electric vehicle, including the following steps: detecting a wheel speed of the electric vehicle to generate a wheel speed signal, and detecting state information of the electric vehicle; acquiring state information of a battery pack of the electric vehicle and state information of four motors of the electric vehicle, obtaining a first side slip signal or a second side slip signal according to the wheel speed signal, the state information of the electric vehicle, the state information of the battery pack, and the state information of the four motors, in which the first side slip signal indicates that the electric vehicle has a side slip and is about to enter a side slip limit interval, and the second side slip signal indicates that the electric vehicle is in the side slip limit interval; and according to the first side slip signal or the second side slip signal, controlling four hydraulic brakes and controlling the four motors by using a motor controller.

For the active safety control method of an electric vehicle according to an embodiment of the present disclosure, when an electric vehicle has a side slip and is about to enter a side slip limit interval, yaw control is performed on the electric vehicle by using driving torques of four motors, so that an attitude of the electric vehicle is corrected, a turning speed of the electric vehicle is improved, a decrease in a vehicle speed caused by braking is avoided, and operational stability of the electric vehicle is improved. When the electric vehicle is in the side slip limit interval, yaw control is performed on the electric vehicle by using the driving torques and feedback braking torques of the four motors and using braking torques of four hydraulic brakes simultaneously, so that the electric vehicle enters a stable state more rapidly, safety of the electric vehicle is improved. When the motors have a limited feedback braking capability, combined control of the braking torques of the hydraulic brakes and feedback braking torques of the motors may be used to rapidly perform compensation of hydraulic braking torques, thereby implementing a combined control function of an active safety controller, and expanding an application scope of the method. Therefore, not only a dynamic control problem of a vehicle body of an all-wheel drive electric automobile and a problem of a slow response speed that exists in a hydraulic electronic stability control system are resolved, but also operational stability and safety of the electric vehicle may be greatly improved.

Additional aspects and advantages of the present disclosure are partially provided in the following description, or become partially obvious from the following description, or are acquired through the practice of the present disclosure.

BRIEF DESCRIPTION OF THE DRAWINGS

The foregoing and/or additional aspects and advantages of the present disclosure become obvious and readily comprehensible from the following description of the embodiments with reference to the accompanying drawings, where.

DETAILED DESCRIPTION

Figure 1:
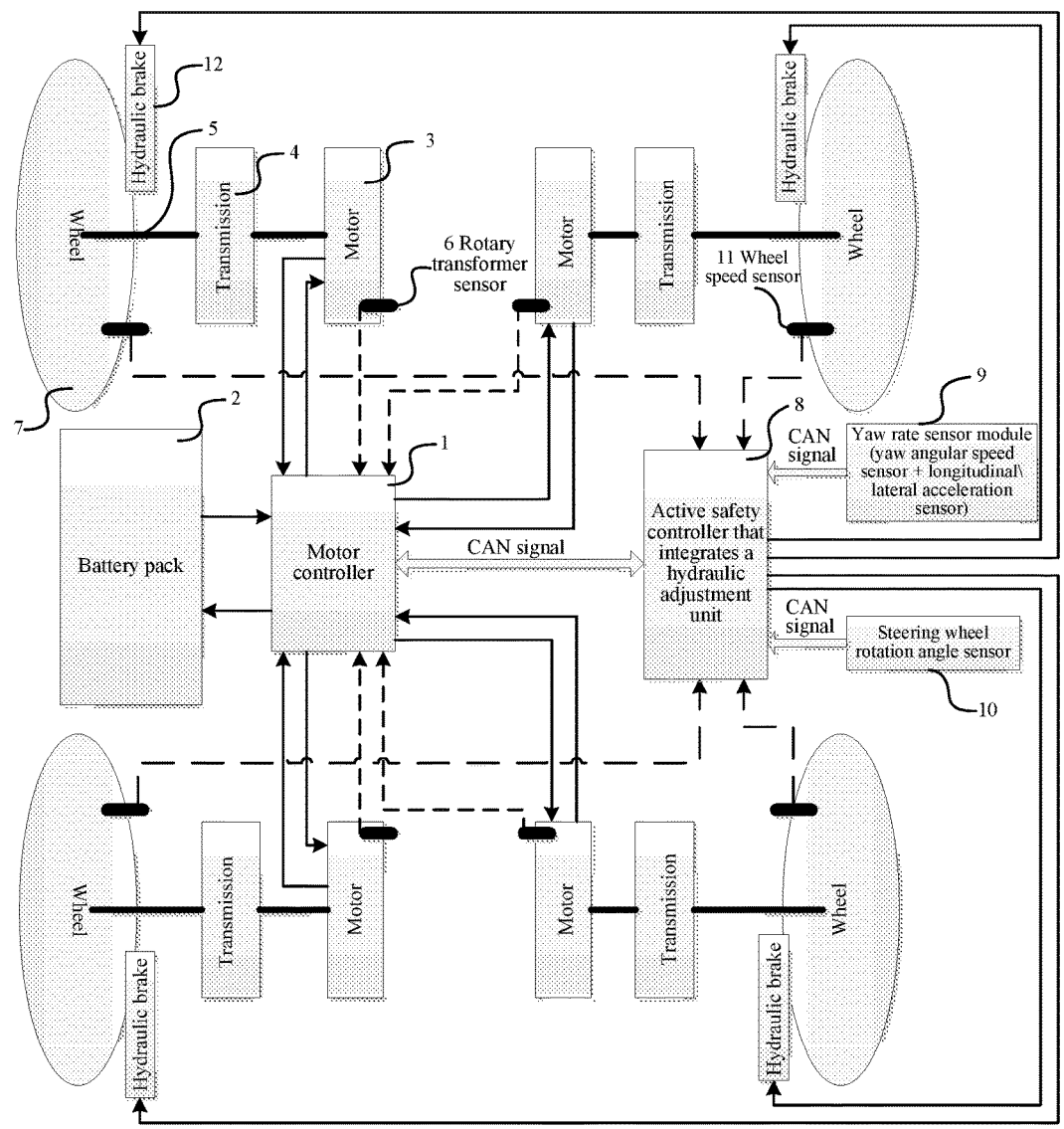
FIG. 1 is a structural block diagram of an active safety control system of an electric vehicle according to an embodiment of the present disclosure.

Embodiments of the present disclosure are described in detail below. Examples of the embodiments are shown in the accompanying drawings, where throughout the drawings, the same or similar reference numerals represent the same or similar elements or elements having the same or similar functions. The following embodiments that are described with reference to the accompanying drawings are exemplary, and are only used to explain the present disclosure, but cannot be explained as a limitation to the present disclosure.

The disclosure below provides many different embodiments or examples that are used to implement different structures of the present disclosure. To simplify the disclosure of the present disclosure, members and settings in specific examples are described below. Certainly, these embodiments or examples are merely examples, and an objective of these embodiments or examples is not to limit the present disclosure. In addition, in the present disclosure, reference numerals and/or letters may be repeated in different examples. Such repetition is for the purpose of simplification and clarity, but does not indicate a relationship between various discussed embodiments and/or settings. In addition, the present disclosure provides examples of various specific processes and materials, but a person skilled in the art may realize applicability of other processes and/or use of other materials. Additionally, a structure in which a first feature is "on" a second feature described in the following may include an embodiment in which the first feature and the second feature are formed in direct contact, or may include an embodiment in which an additional feature is formed between the first feature and the second feature. In this way, the first feature and the second feature may be not in direct contact.

In the description of the present disclosure, it should be noted that unless otherwise specified or defined, the terms "mounted", "connected", and "connection" should be understood in a broad sense. For example, the terms may include a mechanical connection or an electrical connection, or may be communication inside two elements, or may be a direct connection, or may be an indirect connection through an intermediate medium. For a person of ordinary skill in the art, specific meanings of the foregoing terms may be understood according to a specific case.

The present application is provided based on the understanding and research of the following problem by an inventor.

An automobile electronic stability control system is provided in the prior art, and includes: several wheels, several sensors, a power supply, and a control unit. The sensor sends a sensed signal to the control unit. The system further includes hub motors integrated with the wheels. The hub motor is connected to the power supply by using a power line. The control unit sends a control signal to the hub motor. In the solution, a braking function of the hub motor is used to replace an original hydraulic braking execution system, so as to achieve a control effect of an ESP.

As can be seen, an all-wheel drive electric vehicle may perform yaw moment control by using a braking feedback characteristic of a motor, so that an effect of a hydraulic ESP may be replaced. However, requirements on high mileage and high performance of an electric vehicle cause increasingly large overall vehicle mass and overall vehicle rotary inertia, and the hub motors integrated with the wheels cannot provide a sufficient regenerative braking force because of a limit of an arrangement space. Therefore, the automobile electronic stability control system has an inherent disadvantage in providing an active control of yaw moment. Moreover, from a perspective of overall vehicle dynamics, the automobile electronic stability control system in the prior art can perform yaw control on the vehicle from only a perspective of braking, resulting in that operational stability of the vehicle is not ideal, thereby reducing safety of the vehicle.

At the same time, the electric vehicle has some limits in using the braking feedback characteristic of the motor. For example, battery capacity is too high to perform braking feedback, or the motor has a characteristic resulting in a limited feedback capability at a low rotational speed and a high rotational speed. These cases cause that the motor cannot make a timely and powerful response to a braking requirement of the vehicle, resulting in that a driving state of the vehicle keeps deteriorating, making the vehicle enter an uncontrollable and unstable state, which affects driving safety of the vehicle to a certain degree.

An active safety control system of an electric vehicle, an active safety control method of an electric vehicle, and an electric vehicle having the active safety control system provided according to embodiments of the present disclosure are described below with reference to the accompanying drawings.

FIG. 1 is a structural block diagram of an active safety control system of an electric vehicle according to an embodiment of the present disclosure. As shown in FIG. 1, the electric vehicle includes a battery pack 2, four independently controlled motors 3, four transmissions 4, four transmission shafts 5, four wheels 7, and four hydraulic brakes 12. The active safety control system of an electric vehicle includes: a motor controller 1, a wheel speed detection module 100, and an active safety controller 8 that integrates a hydraulic adjustment unit, a yaw rate sensor module 9, and a steering wheel rotation angle sensor 10.

Each transmission 4 is connected to each wheel 7 by using a transmission shaft 5. Each motor 3 is disposed corresponding to each wheel, and is connected to each transmission 4. The wheel speed detection module 100 is configured to detect a wheel speed of an electric vehicle to generate a wheel speed signal. Each hydraulic brake 12 is disposed corresponding to each wheel 7. The motor controller 1 is respectively connected to the battery pack 2 and the four motors 3 by using a high voltage line. The active safety controller 8 and the motor controller 1 communicate with each other. The active safety controller 8 communicates with the steering wheel rotation angle sensor 10 and the yaw rate sensor module 9. The active safety controller 8 is connected to each hydraulic brake 12 by using a brake pipe. The active safety controller 8 receives the wheel speed signal sent by the wheel speed detection module 100 and state information of the electric vehicle sent by the steering wheel rotation angle sensor 10 and the yaw rate sensor module 9. According to the wheel speed signal, the state information of the electric vehicle, state information of the battery pack, and state information of the four motors 3, the active safety controller 8 obtains a first side slip signal indicating that the electric vehicle has a side slip and is about to enter a side slip limit interval or a second side slip signal indicating that the electric vehicle is in the side slip limit interval. After obtaining the first side slip signal or the second side slip signal, the active safety controller 8 controls the four hydraulic brakes 12, and controls the four motors 3 by using the motor controller 1 according to the first side slip signal or the second side slip signal, so that when the electric vehicle has a side slip and is about to enter a side slip limit interval, the yaw control is performed on the electric vehicle by using driving torques of the four motors 3, and when the electric vehicle is in the side slip limit interval, the yaw control is performed on the electric vehicle by using the driving torques and feedback braking torques of the four motors 3 and using braking torques of the four hydraulic brakes 12 simultaneously.

Therefore, for the active safety control system of an electric vehicle in this embodiment of the present disclosure, when the electric vehicle has a side slip and is about to enter a side slip limit interval, that is, the electric vehicle is in an initial stage of a side slip and is not in a working condition of a side slip with a limit attachment, driving functions of the four hub motors are used to improve operational stability capability of the electric vehicle. At the same time, when the electric vehicle is in the side slip limit interval, that is, the electric vehicle is in a working condition of a side slip with a limit attachment, functions of motor driving, motor braking, and hydraulic braking are used to replace an original hydraulic electronic control system, so that advantages of a high response speed and a large adjustment range are obtained, and active safety performance of the electric vehicle is desirably improved. The side slip limit interval refers to a limit working condition in which the electric vehicle has a side slip and is still controllable, and may be determined by using a yaw angular speed difference or a rear shaft slip angle of the electric vehicle.

In an embodiment, as shown in FIG. 1, the steering wheel rotation angle sensor 10 and the yaw rate sensor module 9 send the sensed state information of the electric vehicle to the active safety controller 8 by using a CAN network. The wheel speed detection module 100 may include four wheel speed sensors 11 and/or four rotary transformer sensors 6, where each wheel speed sensor is disposed corresponding to each wheel, and each rotary transformer sensor is disposed corresponding to each motor. The four rotary transformer sensors 6 may be connected to the motor controller 1 by using a hard wire, and provide input information for precise control of torques of the four motors. The four wheel speed sensors 11 may be connected to the active safety controller 8 by using a hard wire, and are configured to provide motion state information of the four wheels. Both the four rotary transformer sensors 6 and the four wheel speed sensors 11 can provide a function of measuring a wheel speed and configured as wheel speed measurement systems. Either wheel speed measurement system may be selected, or the two wheel speed measurement systems may be used at the same time for mutual verification. In this case, if one wheel speed measurement system fails, wheel speed measured by another measurement system is used as a determination reference. As shown in FIG. 1, in the active safety control system of an electric vehicle in this embodiment of the present disclosure, two wheel speed measurement systems that are respectively formed of the four rotary transformer sensors 6 and the four wheel speed sensors 11 are used. The four rotary transformer sensors 6 send measured information to the motor controller 1. The motor controller 1 may send the measured information of the four rotary transformer sensors 6 to the active safety controller 8, so that the measured information is used by the active safety controller 8 to acquire a wheel speed. The four wheel speed sensors 11 may directly send the detected motion state information of the four wheels to the active safety controller 8, so that the motion state information is used by the active safety controller 8 to acquire a wheel speed. The four motors 3 are independently controlled and do not affect each other. Each motor 3 and each transmission 4 are fixedly connected. Each transmission 4 is connected to each wheel 7 by using a transmission shaft 5.

Moreover, the active safety controller 8 that integrates the hydraulic adjustment unit is respectively connected to the four hydraulic brakes 12 by using brake pipes respectively, and a propagation medium is a brake fluid, so that precise control of a hydraulic braking force of a single wheel may be implemented. The hydraulic brakes 12 are fixed on the wheels 7, and a hydraulic pressure is used to provide a braking force for compression of a friction plate. The battery pack 2 is connected to the motor controller 1 by using a high voltage line, and may implement a charging process and a discharging process. The motor controller 1 is connected to the four motors 3 by using a high voltage line. The four motors 3 are independently controlled and do not affect each other. The four motors 3 may all independently provide a driving or braking function. The active safety controller 8 that integrates the hydraulic adjustment unit may be connected to the motor controller 1 by using the CAN network to perform information interaction. The active safety controller 8 that integrates the hydraulic adjustment unit sends an instruction to the motor controller 1 by using the CAN network, and requires the motor controller 1 to perform torque control on the motors of the four wheels, so as to provide suitable driving torques or braking torques. At the same time, the active safety controller 8 that integrates the hydraulic adjustment unit may adjust a hydraulic braking torque of a corresponding wheel in time according to the feedback braking torques of the motors provided by the motor controller 1, so as to perform combined control of two types of braking torques.

Therefore, in this embodiment of the present disclosure, after receiving state signals of members such as the steering wheel rotation angle sensor 10, the yaw rate sensor module 9, the wheel speed sensors 11, the battery pack 2, and the four motors 3, the active safety controller 8 determines an overall vehicle attitude and a road surface condition. When attitude adjustment needs to be performed on the electric vehicle, the active safety controller 8 performs calculation according to data that is detected by the steering wheel rotation angle sensor 10, the yaw rate sensor module 9, and the wheel speed sensors 11, to obtain corresponding control information, at the same time sends a control instruction according to a state of the battery pack 2 and capabilities of the four motors 3, uses the motor controller 1 to enable the four motors 3 to send driving torques or braking torques, and controls the four hydraulic brakes 12 to adjust a hydraulic braking torque of a corresponding wheel in time, so as to change a torque at an end of a wheel, thereby achieving target data specified by the active safety controller 8, and at the same time enabling the electric vehicle to achieve a stable state. In an execution process, the active safety controller 8 monitors states of members such as the steering wheel rotation angle sensor 10, the yaw rate sensor module 9, the rotary transformer sensors 6, the wheel speed sensors 11, the battery pack 2, and the four motors 3 in real time, performs determination according to received parameters, adjusts target parameters in real time, and at the same time controls the four motors and the four hydraulic brakes.

According to an embodiment of the present disclosure, the yaw rate sensor module includes a yaw angular speed sensor, a vertical acceleration sensor, and a lateral acceleration sensor.

Moreover, in a driving process of the electric vehicle, the active safety controller 8 calculates a target yaw angular speed $$\Psi'_{target} = \frac{V_x \times \delta}{L \times \left(1 + \left(\frac{V_x}{V_{ch}}\right)^2\right)}$$

($V_x$ is a vertical vehicle speed, $V_x$ is obtained through estimation according to the wheel speed signals of the four wheels and the vertical acceleration of the electric vehicle, $\delta$ is a front wheel rotation angle, and the front wheel rotation angle $\delta$ is obtained according to a steering wheel rotation angle signal, where a ratio of a steering wheel rotation angle of the electric vehicle to the front wheel rotation angle is fixed; therefore, the front wheel rotation angle may be obtained through calculation by using the steering wheel rotation angle signal, where L is a wheelbase, and $V_{ch}$ is a feature vehicle speed) of the electric vehicle in real time according to a steering wheel rotation angle signal detected by the steering wheel rotation angle sensor 10, a vertical acceleration detected by the vertical acceleration sensor and a wheel speed signal, and compares the target yaw angular speed with an actual yaw angular speed $\Psi'_{actual}$ of the electric vehicle detected by the yaw angular speed sensor to obtain a yaw angular speed difference $\Delta\Psi' = \Psi'_{target} - \Psi'_{actual}$. At the same time, the active safety controller 8 calculates a rear shaft slip angle $$\alpha_r = -\beta + \frac{L_r \Psi'_{actual}}{V_x}$$

($\alpha_r$ is the rear shaft slip angle, $\beta$ is a mass-center slip angle, $\beta$ is approximately equal to a vertical vehicle speed divided by a lateral vehicle speed, the lateral vehicle speed is obtained by performing integration by using the lateral acceleration, $L_r$ is a distance between a center of mass and a rear shaft and is one preset value, and $\Psi'_{actual}$ is the actual yaw angular speed) of the electric vehicle according to the wheel speed signal, the steering wheel rotation angle signal, the vertical acceleration, the actual yaw angular speed of the electric vehicle, and a lateral acceleration of the electric vehicle detected by the lateral acceleration sensor, and the active safety controller 8 calculates a yaw moment difference $\Delta M = I \times (\Psi'_{target} - \Psi'_{actual})$ between a target yaw moment and an actual yaw moment of the electric vehicle in real time according to the target yaw angular speed and the actual yaw angular speed of the electric vehicle and by using an overall vehicle rotary inertia I of the electric vehicle. A yaw angular speed difference threshold $\Delta\Psi_1'$, that is, a first preset angular speed, a rear shaft slip angle threshold value $\alpha_{r-1}$, that is, a first preset angle (a threshold for engaging motor driving in yaw control), the yaw angular speed difference threshold $\Delta\Psi_2'$, that is, a second preset angular speed, and the rear shaft slip angle threshold value $\alpha_{r-2}$, that is, a second preset angle (a threshold for engaging motor braking and hydraulic braking in yaw control) are further preset in the active safety controller 8.

It should be noted that, in this embodiment of the present disclosure, if the yaw angular speed difference $\Delta\psi'$ is less than the first preset angular speed or the rear shaft slip angle is less than the first preset angle, it indicates that the electric vehicle does not have a side slip, the overall vehicle runs stably, and the active safety control system does not need to be engaged in control. If the yaw angular speed difference $\Delta\psi'$ is greater than the first preset angular speed and is less than or equal to a second preset angular speed or the rear shaft slip angle is greater than the first preset angle and is less than or equal to the second preset angle, it indicates that the electric vehicle has a side slip and is about to enter a side slip limit interval, the active safety control system needs to be controlled to enter a driving force yaw control mode and the active safety controller 8 obtains the first side slip signal, so as to perform the yaw control on the electric vehicle by using driving torques of the four motors. If the yaw angular speed difference $\Delta\psi'$ is greater than the second preset angular speed or the rear shaft slip angle is greater than the second preset angle, it indicates that the electric vehicle is in the side slip limit interval, and the active safety control system needs to be controlled to enter a driving force yaw control mode and a braking force yaw control mode at the same time and the active safety controller 8 obtains the second side slip signal, so as to perform the yaw control on the electric vehicle by using the driving torques and feedback braking torques of the four motors and using braking torques of the four hydraulic brakes simultaneously.

When the yaw angular speed difference $\Delta\psi'$ is greater than the first preset angular speed and is less than or equal to the second preset angular speed or the rear shaft slip angle is greater than the first preset angle and is less than or equal to the second preset angle, the active safety controller 8 determines that the electric vehicle has a side slip and is about to enter a side slip limit interval, and controls the active safety control system to enter a driving force yaw control mode. After the active safety control system enters the driving force yaw control mode, that is, when the active safety controller performs yaw control on the electric vehicle by using the driving torques of the four motors, the active safety controller 8 performs calculation by using a preset overall vehicle dynamics model and a preset tire model and according to driving torques of the four wheels of the electric vehicle in a current state to obtain a first opposite yaw moment (opposite to a direction of $\Delta M$), and performs yaw control on the electric vehicle according to the first opposite yaw moment to calibrate the attitude of the electric vehicle, where the driving torques of the four wheels are obtained according to the driving torques of the four motors. In other words, the active safety controller 8 performs calculation by using a preset overall vehicle dynamics model and a preset tire model and according to driving torques of the four wheels of the electric vehicle in a current state and the yaw moment difference $\Delta M$ to obtain a first opposite yaw moment, and performs yaw control on the electric vehicle according to the first opposite yaw moment to calibrate the attitude of the electric vehicle, where the driving torques of the four wheels are obtained according to the driving torques of the four motors. That is, the active safety controller 8 performs calculation to obtain a usable active control yaw moment value corresponding to each wheel, and selects from four usable active control yaw moment values that are obtained through calculation, one or more maximum values to increase driving forces for wheels corresponding to the one or two maximum values, to perform yaw moment control, so that a turning speed of the electric vehicle can be improved, the attitude of the electric vehicle is corrected, and operational stability of the electric vehicle is improved. It should be noted that, a torque direction of a same wheel changes with a change of the attitude of the vehicle. For example, at a certain moment, that is, a moment T1, a left-front wheel torque is usable, and at another certain moment, that is, a moment T2, the left-front wheel torque may have an opposite effect and is therefore unusable. Therefore, opposite yaw moments of the four wheels are instantaneous, and may be simply summarized as usable active control yaw moments.

When the yaw angular speed difference $\Delta\psi'$ is greater than the second preset angular speed or the rear shaft slip angle is greater than the second preset angle, the active safety controller 8 determines that the electric vehicle enters a working condition of a side slip with a limit attachment, that is, is in the side slip limit interval, and controls the active safety control system to enter a driving force yaw control mode and a braking force yaw control mode at the same time. Moreover, when the active safety control system enters the driving force yaw control mode and the braking force yaw control mode at the same time, that is, when the active safety controller performs yaw control on the electric vehicle by using the driving torques and feedback braking torques of the four motors and braking torques of the four hydraulic brakes at the same time, the active safety controller 8 performs calculation by using the preset overall vehicle dynamics model and the preset tire model according to the driving torques and braking torques of the four wheels of the electric vehicle in a current state to obtain a second opposite yaw moment to cancel out the yaw moment difference $\Delta M$, to enable the electric vehicle to enter a stable state. In other words, the active safety controller 8 performs calculation by using the preset overall vehicle dynamics model and the preset tire model according to the driving torques of the four wheels, braking torques of the four wheels of the electric vehicle in the current state and the yaw moment difference $\Delta M$ to obtain the second opposite yaw moment and to enable the electric vehicle to enter a stable state. Where the braking torques of the four wheels are obtained according to the feedback braking torques of the four motors and the braking torques of the four hydraulic brakes, and the driving torques of the four wheels are obtained according to the driving torques of the four motors. It should be noted that, the braking force is implemented through combined control of feedback braking of the motors and braking of the hydraulic brakes by using the active safety controller 8 that integrates the hydraulic adjustment unit. When feedback braking capabilities of the motors are limited, the hydraulic brakes perform compensation of hydraulic braking forces in time. As compared with a conventional ESP, a characteristic of rapid response of the motors may be fully used, so as to enable the vehicle to enter a stable state more rapidly.

According to an embodiment of the present disclosure, when the active safety controller 8 performs yaw control on the electric vehicle by using the driving torques and feedback braking torques of the four motors and using braking torques of the four hydraulic brakes simultaneously, if the active safety controller 8 determines that the feedback braking torques of the four motors satisfy the yaw control requirement (i.e., the required braking torque is less than or equal to that provided by the four motors), the braking torques of the four wheels are completely obtained from the feedback braking torques of the four motors; and if the active safety controller 8 determines that the feedback braking torques of the four motors cannot satisfy the yaw control requirement (i.e., the required braking torque is greater than that provided by the four motors), the braking torques of the four wheels are obtained from the feedback braking torques of the four motors and the braking torques of the four hydraulic brakes.

That is, after the active safety control system enters the driving force yaw control mode and the braking force yaw control mode at the same time, when yaw control requires a braking torque $T_{request}$ less than or equal to a feedback braking torque $T_{brake-motor}$ that can be provided by the motor, the feedback braking torque of the motor is completely used to perform control; when yaw control requires a braking torque $T_{request}$ greater than the feedback braking torque $T_{brake-motor}$ that can be provided by the motor, the feedback braking torque $T_{brake-motor}$ of the motor is first used to perform control, and a needed hydraulic braking torque $T_{brake-hydraulic}=T_{request}-T_{brake-motor}$ is calculated at the same time, and the active safety controller 8 that integrates the hydraulic adjustment unit rapidly performs active boosting of a hydraulic pressure to engage the hydraulic pressure in yaw moment control. Therefore, in this embodiment of the present disclosure, for a case in which the motors have insufficient feedback braking capabilities, a hydraulic braking force may be used in time to perform compensation control, so as to resolve a problem that exists in a feedback aspect of a motor of an all-wheel drive electric vehicle.

Figure 2:
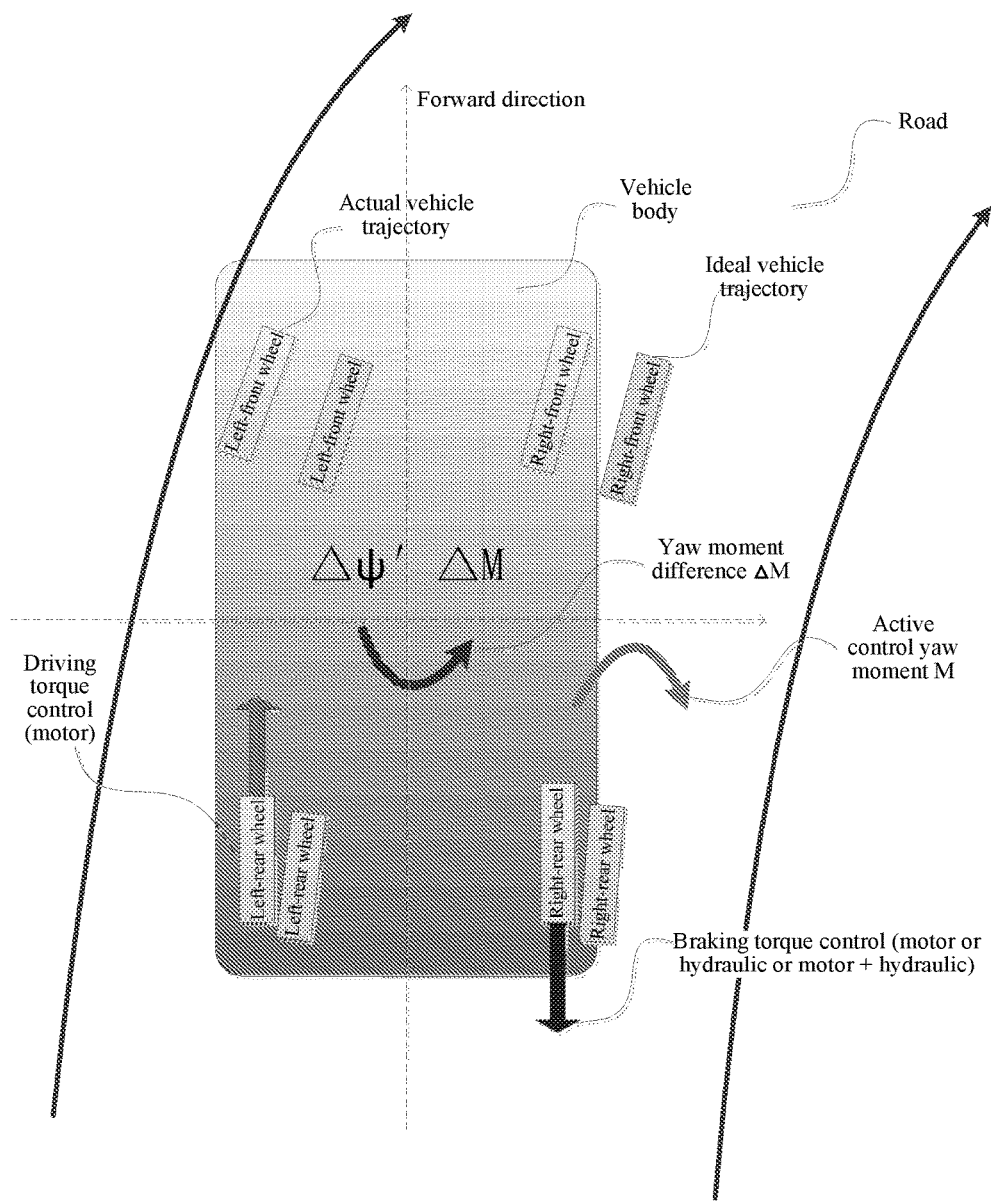
FIG. 2 is a schematic view of active safety control performed on an electric vehicle by an active safety control system when the electric vehicle is in a right-turn understeer state according to an embodiment of the present disclosure.

Specifically, according to an embodiment of the present disclosure, as shown in FIG. 2, when the active safety controller 8 determines that the electric vehicle is in a right-turn understeer state and front wheels of the electric vehicle have a side slip, if the yaw angular speed difference $\Delta\psi'$ is greater than the first preset angular speed and is less than or equal to a second preset angular speed, the active safety controller 8 controls a motor corresponding to a left-rear wheel of four wheels by using the motor controller 1 to increase a driving torque, to ensure that an active yaw moment generated from an additionally increased driving torque is $M=-\Delta M$, thereby improving a turning speed of the electric vehicle, and improving an operational stability characteristic of the electric vehicle; and if the yaw angular speed difference $\Delta\psi'$ is greater than the second preset angular speed, the active safety controller 8 controls a motor corresponding to the left-rear wheel by using the motor controller 1 to increase a driving torque, at the same time performs braking control on a right-rear wheel of the four wheels, and at the same time performs determination of $T_{request}$ and $T_{brake-motor}$, to ensure that an active yaw moment generated from both driving and braking is $M=-\Delta M$, to enable the electric vehicle to enter a stable state as soon as possible.

Figure 3:
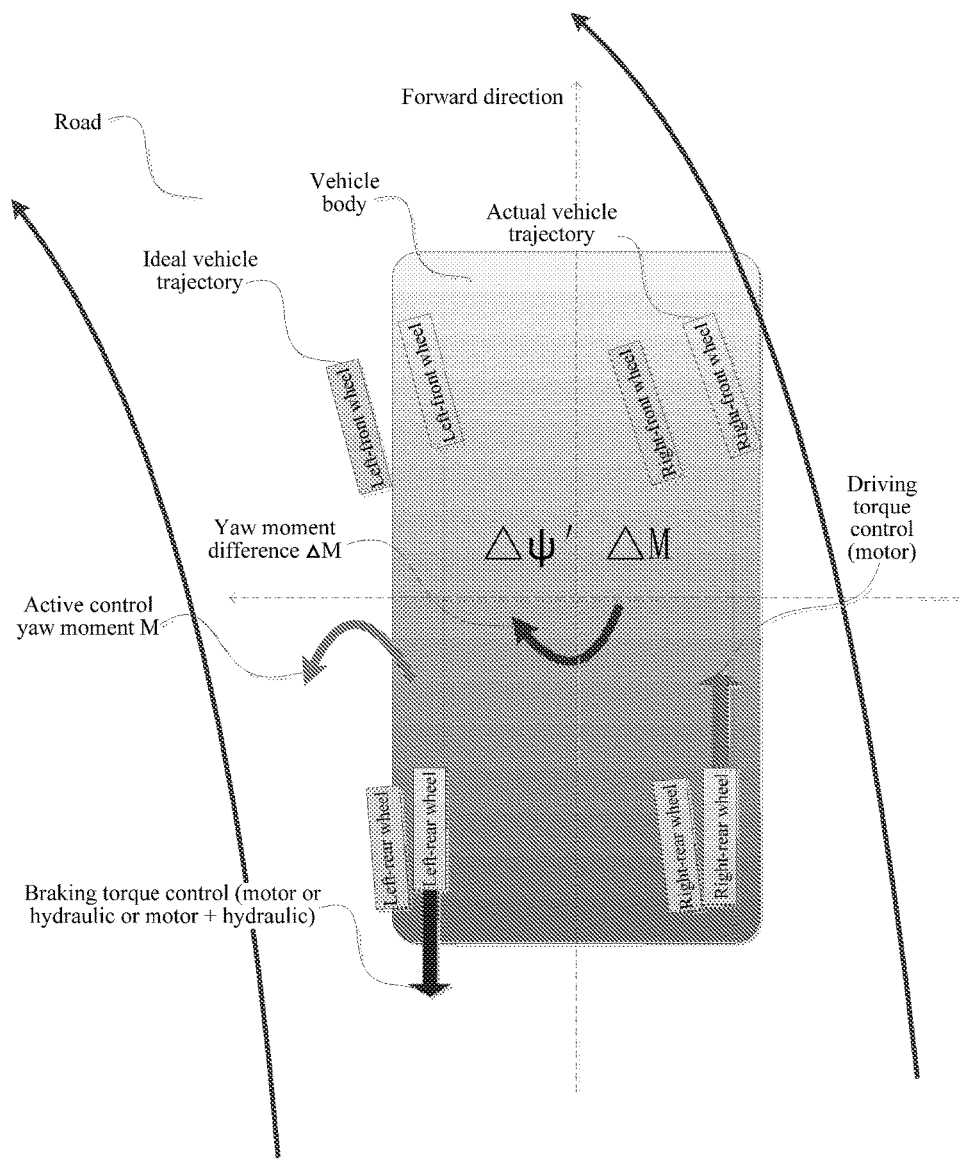
FIG. 3 is a schematic view of active safety control performed on an electric vehicle by an active safety control system when the electric vehicle is in a left-turn understeer state according to an embodiment of the present disclosure.

According to an embodiment of the present disclosure, as shown in FIG. 3, when the active safety controller 8 determines that the electric vehicle is in a left-turn understeer state and front wheels of the electric vehicle have a side slip, if the yaw angular speed difference $\Delta\psi'$ is greater than the first preset angular speed and is less than or equal to a second preset angular speed, the active safety controller 8 controls a motor corresponding to a right-rear wheel of the four wheels by using the motor controller 1 to increase a driving torque, to ensure that an active yaw moment generated from an additionally increased driving torque is $M=-\Delta M$, thereby improving a turning speed of the electric vehicle, and improving an operational stability characteristic of the electric vehicle; and if the yaw angular speed difference $\Delta\psi'$ is greater than the second preset angular speed, the active safety controller 8 controls a motor corresponding to the right-rear wheel by using the motor controller 1 to increase a driving torque, at the same time performs braking control on the left-rear wheel of the four wheels, and at the same time performs determination of $T_{request}$ and $T_{brake-motor}$ to ensure that an active yaw moment generated from both driving and braking is $M=-\Delta M$, to enable the electric vehicle to enter a stable state as soon as possible.

Figure 4:
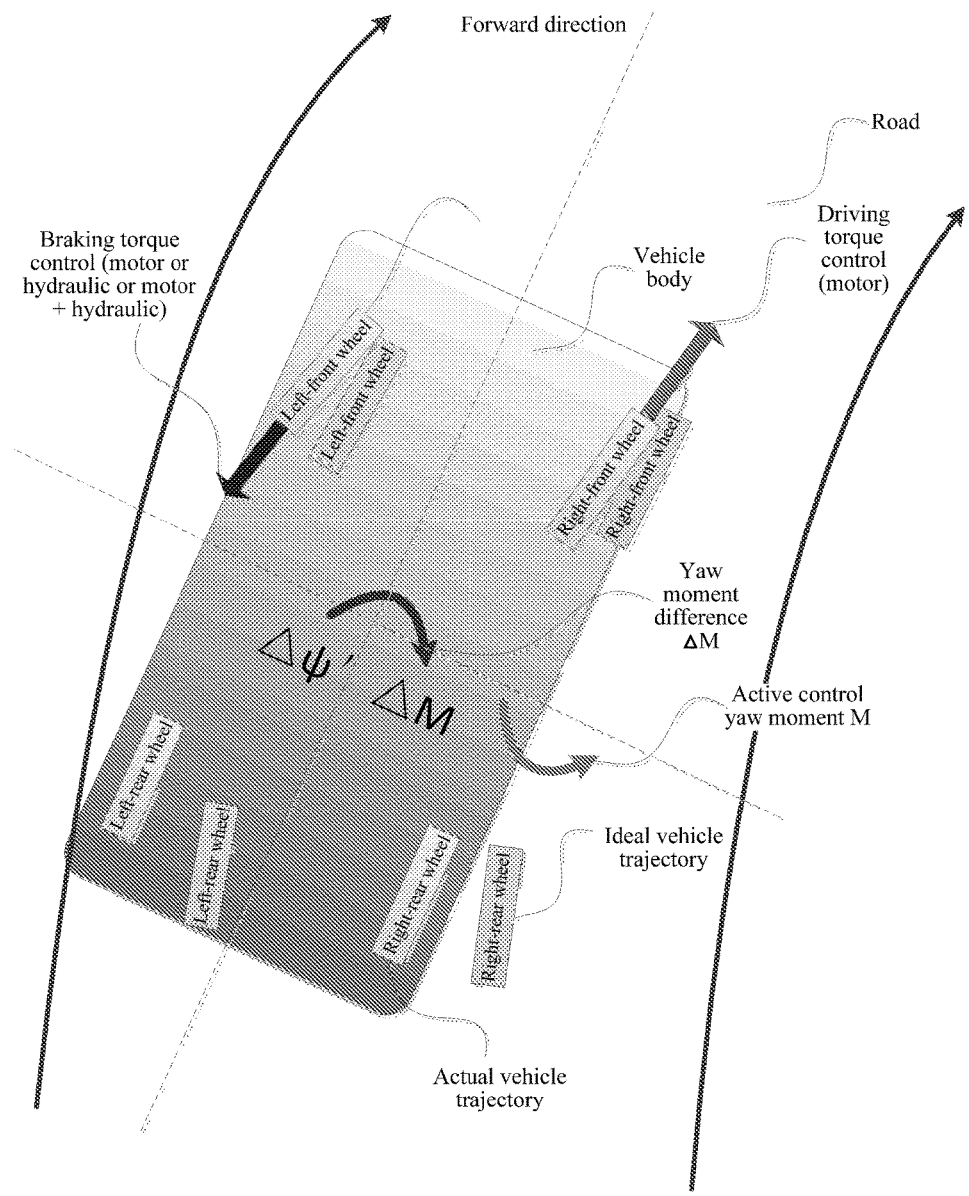
FIG. 4 is a schematic view of active safety control performed on an electric vehicle by an active safety control system when the electric vehicle is in a right-turn oversteer state according to another embodiment of the present disclosure.

In another embodiment of the present disclosure, as shown in FIG. 4, when the active safety controller 8 determines that the electric vehicle is in a right-turn oversteer state and rear wheels of the electric vehicle have a side slip, if the rear shaft slip angle is greater than the first preset angle and is less than or equal to the second preset angle, the active safety controller 8 controls a motor corresponding to a right-front wheel of four wheels by using the motor controller 1 to increase a driving torque, to ensure that an active yaw moment generated from the increased driving torque is $M=-\Delta M$, thereby improving a turning speed of the electric vehicle, and improving an operational stability characteristic of the electric vehicle; and if the rear shaft slip angle is greater than the second preset angle, the active safety controller 8 controls a motor corresponding to the right-front wheel by using the motor controller 1 to increase a driving torque, at the same time performs braking control on a left-front wheel of the four wheels, and at the same time performs determination of $T_{request}$ and $T_{brake-motor}$ to ensure that an active yaw moment generated from both driving and braking is $M=-\Delta M$, to enable the electric vehicle to enter a stable state as soon as possible.

Figure 5:
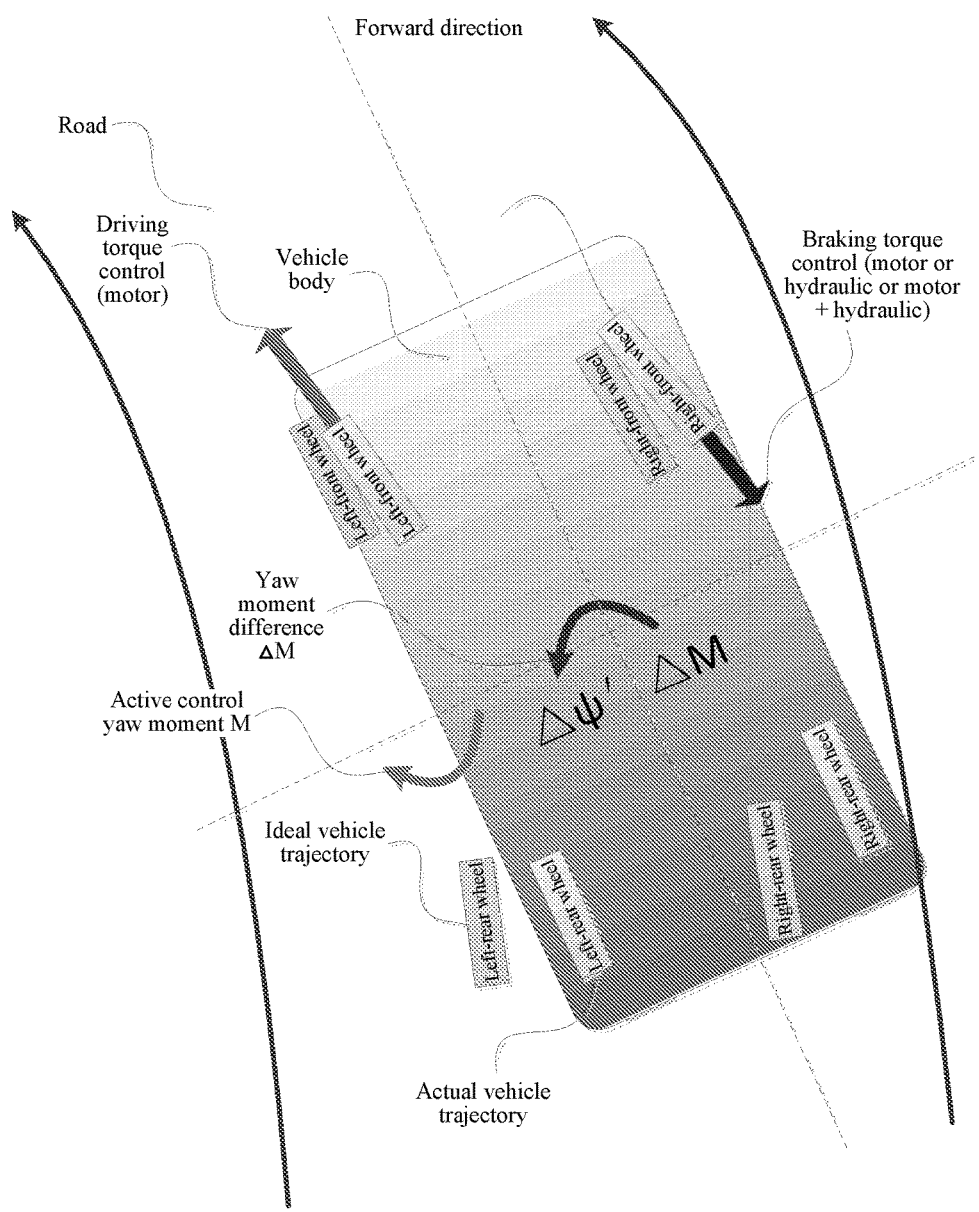
FIG. 5 is a schematic view of active safety control performed on an electric vehicle by an active safety control system when the electric vehicle is in a left-turn oversteer state according to another embodiment of the present disclosure.

According to another embodiment of the present disclosure, as shown in FIG. 5, when the active safety controller 8 determines that the electric vehicle is in a left-turn oversteer state and rear wheels of the electric vehicle have a side slip, if the rear shaft slip angle is greater than the first preset angle and is less than or equal to the second preset angle, the active safety controller 8 controls a motor corresponding to a left-front wheel of the four wheels by using the motor controller 1 to increase a driving torque, to ensure that an active yaw moment generated from the increased driving torque is $M=-\Delta M$, thereby improving a turning speed of the electric vehicle, and improving an operational stability characteristic of the electric vehicle; and if the rear shaft slip angle is greater than the second preset angle, the active safety controller 8 controls a motor corresponding to the left-front wheel by using the motor controller 1 to increase a driving torque, at the same time performs braking control on a right-front wheel of the four wheels, and at the same time performs determination of $T_{request}$ and $T_{brake-motor}$, to ensure that active yaw moment generated by both driving and braking is $M=-\Delta M$, to enable the electric vehicle to enter a stable state as soon as possible.

When a difference between the actual yaw angular speed of the electric vehicle and the target yaw angular speed is greater than a preset difference threshold, but the rear shaft slip angle does not reach a preset angle threshold, it indicates that front wheels are in understeer state; and when the rear shaft slip angle reaches the preset angle threshold, but the difference between the actual yaw angular speed of the electric vehicle and the target yaw angular speed does not reach the preset difference threshold, it indicates that rear wheels are in oversteer state. It may be determined whether the electric vehicle is left turning or right turning by determining whether the steering wheel rotation angle signal has a positive or negative value. Therefore, in this embodiment of the present disclosure, the active safety controller may determine a current steering state of the electric vehicle, for example, right-turn understeer, left-turn understeer, right-turn oversteer, and left-turn oversteer.

For the active safety control system of an electric vehicle according to this embodiment of the present disclosure, when an electric vehicle has a side slip and is about to enter a side slip limit interval, yaw control is performed on the electric vehicle by using driving torques of the four motors, so that an attitude of the electric vehicle is corrected, a turning speed of the electric vehicle is improved, a decrease in a vehicle speed caused by braking is avoided, and operational stability of the electric vehicle is improved. When the electric vehicle is in the side slip limit interval, yaw control is performed on the electric vehicle by using the driving torques and feedback braking torques of the four motors and using braking torques of the four hydraulic brakes simultaneously, so that the electric vehicle enters a stable state more rapidly, safety of the electric vehicle is improved, and when the motors have a limited feedback braking capability, combined control of braking torques of the hydraulic brakes and feedback braking torques of the motors may be used to rapidly perform compensation of hydraulic braking torques, thereby implementing a combined control function of the active safety controller, and expanding an application scope of the system. Therefore, not only a dynamic control problem of a vehicle body of an all-wheel drive electric automobile and a problem of a slow response speed that exists in a hydraulic electronic stability control system are resolved, but also operational stability and safety of a vehicle may be greatly improved. In addition, for the active safety control system of an electric vehicle in this embodiment of the present disclosure, a drive architecture of an all-wheel hub motor plus a transmission plus a transmission shaft is disposed, which not only facilitates space arrangement, but also can significantly improve driving and braking feedback capabilities of the electric vehicle.

Moreover, an embodiment of the present disclosure further provides an electric vehicle, including the foregoing active safety control system of an electric vehicle.

According to the electric vehicle in this embodiment of the present disclosure, when a side slip occurs and the electric vehicle is about to enter a side slip limit interval, yaw control is performed by using driving torques of four motors, so that an attitude of the electric vehicle is corrected, a turning speed of the electric vehicle is improved, a decrease in a vehicle speed caused by braking is avoided, and operational stability is improved; and when the electric vehicle is in the side slip limit interval, yaw control is performed by using the driving torques and feedback braking torques of the four motors and braking torques of the four hydraulic brakes at the same time, so that the electric vehicle enters a stable state more rapidly, thereby improving safety, and when the motors have limited feedback braking capabilities, combined control of braking torques of the hydraulic brakes and feedback braking torques of the motors may be used to rapidly perform compensation of hydraulic braking torques, thereby implementing a combined control function of an active safety controller, and having a wider application scope and high safety.

Figure 6:
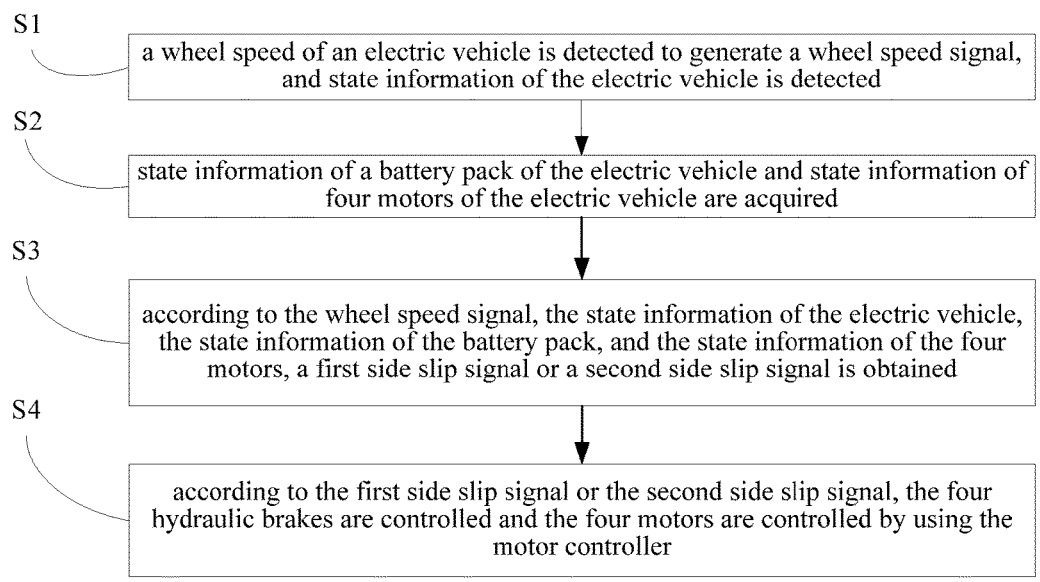
FIG. 6 is a flow chart of an active safety control method of an electric vehicle according to an embodiment of the present disclosure.

FIG. 6 is a flowchart of an active safety control method of an electric vehicle according to an embodiment of the present disclosure. The electric vehicle uses the active safety control system of an electric vehicle described in the foregoing embodiment. As shown in FIG. 6, the active safety control method of an electric vehicle includes following steps.

S1: a wheel speed of an electric vehicle is detected by using a wheel speed detection module to generate a wheel speed signal, and state information of the electric vehicle is detected by using a steering wheel rotation angle sensor and a yaw rate sensor module.

The state information of the electric vehicle includes a steering wheel rotation angle signal, an actual yaw angular speed of the electric vehicle, and a lateral acceleration and a vertical acceleration of the electric vehicle. The steering wheel rotation angle signal may be detected by the steering wheel rotation angle sensor. The actual yaw angular speed of the electric vehicle and the lateral acceleration and the vertical acceleration of the electric vehicle may be detected by the yaw rate sensor module.

S2: state information of a battery pack of the electric vehicle and state information of four motors of the electric vehicle are acquired.

S3: according to the wheel speed signal, the state information of the electric vehicle, the state information of the battery pack, and the state information of the four motors, a first side slip signal or a second side slip signal is obtained. The first side slip signal indicates that the electric vehicle has a side slip and is about to enter a side slip limit interval, and the second side slip signal indicates that the electric vehicle is in the side slip limit interval.

S4: according to the first side slip signal or the second side slip signal, the four hydraulic brakes are controlled and the four motors are controlled by using the motor controller, so that when the electric vehicle has a side slip and is about to enter a side slip limit interval, yaw control is performed on the electric vehicle by using driving torques of the four motors, and when the electric vehicle is in the side slip limit interval, yaw control is performed on the electric vehicle by using the driving torques and feedback braking torques of the four motors and using braking torques of the four hydraulic brakes simultaneously.

According to an embodiment of the present disclosure, in a driving process of the electric vehicle, the active safety controller calculates a target yaw angular speed of the electric vehicle in real time according to the steering wheel rotation angle signal, the vertical acceleration and the wheel speed signal, and compares the target yaw angular speed with the actual yaw angular speed of the electric vehicle to obtain the yaw angular speed difference $\Delta\psi'$. At the same time, the active safety controller further calculates the rear shaft slip angle of the electric vehicle according to the wheel speed signal, the steering wheel rotation angle signal, the vertical acceleration, the actual yaw angular speed of the electric vehicle and the lateral acceleration of the electric vehicle, and the active safety controller calculates a yaw moment difference $\Delta M$ between a target yaw moment and an actual yaw moment of the electric vehicle in real time according to the target yaw angular speed and the actual yaw angular speed of the electric vehicle and by using an overall vehicle rotary inertia of the electric vehicle. When the yaw angular speed difference $\Delta\psi'$ is greater than a first preset angular speed and is less than or equal to a second preset angular speed or the rear shaft slip angle is greater than a first preset angle and is less than or equal to a second preset angle, the active safety controller obtains and the first side slip signal and determines that the electric vehicle has a side slip and is about to enter a side slip limit interval, and controls the active safety control system to enter a driving force yaw control mode, so that yaw control is performed on the electric vehicle by using the driving torques of the four motors. When the yaw angular speed difference Δψ' is greater than the second preset angular speed or the rear shaft slip angle is greater than the second preset angle, the active safety controller obtains and the second side slip signal and determines that the electric vehicle enters a working condition of a side slip with a limit attachment, that is, is in the side slip limit interval, and controls the active safety control system to enter the driving force yaw control mode and a braking force yaw control mode at the same time, so that yaw control is performed on the electric vehicle by using the driving torques and feedback braking torques of the four motors and using braking torques of the four hydraulic brakes simultaneously.

Moreover, after the active safety control system enters the driving force yaw control mode, that is, when the active safety controller performs yaw control on the electric vehicle by using the driving torques of the four motors, the active safety controller performs calculation by using a preset overall vehicle dynamics model and a preset tire model and according to driving torques of the four wheels of the electric vehicle in a current state and the yaw moment difference ΔM to obtain a first opposite yaw moment, and performs yaw control on the electric vehicle according to the first opposite yaw moment to calibrate an attitude of the electric vehicle. The driving torques of the four wheels are obtained according to the driving torques of the four motors. After the active safety control system enters the driving force yaw control mode and the braking force yaw control mode at the same time, that is, when the active safety controller performs yaw control on the electric vehicle by using the driving torques and feedback braking torques of the four motors and using braking torques of the four hydraulic brakes simultaneously, the active safety controller performs calculation by using the preset overall vehicle dynamics model and the preset tire model and according to the driving torques and braking torques of the four wheels of the electric vehicle in a current state and the yaw moment difference ΔM to obtain a second opposite yaw moment to cancel out the yaw moment difference ΔM, to enable the electric vehicle to enter a stable state, where the braking torques of the four wheels are obtained according to the feedback braking torques of the four motors and the braking torques of the four hydraulic brakes, and the driving torques of the four wheels are obtained according to the driving torques of the four motors.

According to an embodiment of the present disclosure, when the active safety controller performs yaw control on the electric vehicle by using the driving torques and feedback braking torques of the four motors and using braking torques of the four hydraulic brakes simultaneously, if the active safety controller determines that the feedback braking torques of the four motors satisfy the yaw control requirement (i.e., the required braking torque is less than or equal to that provided by the four motors), the braking torques of the four wheels are obtained by using the feedback braking torques completely; and if the active safety controller determines that the feedback braking torques of the four motors cannot satisfy the yaw control requirement (i.e., the required braking torque is greater than that provided by the four motors), the braking torques of the four wheels are obtained by using the feedback braking torques and the braking torques of the four hydraulic brakes at the same time.

That is, after the active safety control system enters the driving force yaw control mode and the braking force yaw control mode, when yaw control requires a braking torque $T_{request}$ less than or equal to a feedback braking torque $T_{brake-motor}$ that can be provided by a motor, the feedback braking torque of the motor is used completely to perform control; and when yaw control requires a braking torque $T_{request}$ greater than feedback braking torque $T_{brake-motor}$ that can be provided by the motor, the feedback braking torque $T_{brake-motor}$ of the motor is first used to perform control and a needed hydraulic braking torque $T_{brake-hydraulic}=T_{request}-T_{brake-motor}$ is calculated at the same time, and the active safety controller that integrates the hydraulic adjustment unit rapidly performs active boosting of a hydraulic pressure to engage the hydraulic pressure in yaw moment control. Therefore, in this embodiment of the present disclosure, for a case in which the motors have insufficient feedback braking capabilities, a hydraulic braking force may be used in time to perform compensation control, so as to resolve a problem that exists in a feedback aspect of a motor of an all-wheel drive the electric vehicle.

Specifically, according to an embodiment of the present disclosure, as shown in FIG. 2, when the active safety controller 8 determines that the electric vehicle is in a right-turn understeer state and front wheels of the electric vehicle have a side slip, if the yaw angular speed difference Δψ' is greater than the first preset angular speed and is less than or equal to a second preset angular speed, the active safety controller 8 controls a motor corresponding to a left-rear wheel of four wheels by using the motor controller 1 to increase a driving torque, to ensure that an active yaw moment generated from an additionally increased driving torque is M=−ΔM, thereby improving a turning speed of the electric vehicle, and improving an operational stability characteristic of the electric vehicle; and if the yaw angular speed difference Δψ' is greater than the second preset angular speed, the active safety controller 8 controls a motor corresponding to the left-rear wheel by using the motor controller 1 to increase a driving torque, at the same time performs braking control on a right-rear wheel of the four wheels, and at the same time performs determination of $T_{request}$ and $T_{brake-motor}$, thereby ensuring that an active yaw moment generated from both driving and braking is M=−ΔM, to enable the electric vehicle to enter a stable state as soon as possible.

According to an embodiment of the present disclosure, as shown in FIG. 3, when the active safety controller 8 determines that the electric vehicle is in a left-turn understeer state and front wheels of the electric vehicle have a side slip, if the yaw angular speed difference Δψ' is greater than the first preset angular speed and is less than or equal to second preset angular speed, the active safety controller 8 controls a motor corresponding to a right-rear wheel of the four wheels by using the motor controller 1 to increase a driving torque, to ensure that an active yaw moment generated from an additionally increased driving torque is M=−ΔM, thereby improving a turning speed of the electric vehicle, and improving an operational stability characteristic of the electric vehicle; and if the yaw angular speed difference Δψ' is greater than the second preset angular speed, the active safety controller 8 controls a motor corresponding to the right-rear wheel by using the motor controller 1 to increase a driving torque, at the same time performs braking control on the left-rear wheel of the four wheels, and at the same time performs determination of $T_{request}$ and $T_{brake-motor}$ to ensure that an active yaw moment generated from both driving and braking is M=−ΔM, to enable the electric vehicle to enter a stable state as soon as possible.

Specifically, according to another embodiment of the present disclosure, as shown in FIG. 4, when the active safety controller 8 determines that the electric vehicle is in a right-turn oversteer state and rear wheels of the electric vehicle have a side slip, if the rear shaft slip angle is greater than the first preset angle and is less than or equal to the second preset angle, the active safety controller 8 controls a motor corresponding to a right-front wheel of four wheels by using the motor controller 1 to increase a driving torque, to ensure that an active yaw moment generated from the increased driving torque is M=−ΔM, thereby improving a turning speed of the electric vehicle, and improving an operational stability characteristic of the electric vehicle. If the rear shaft slip angle is greater than the second preset angle, the active safety controller 8 controls a motor corresponding to the right-front wheel by using the motor controller 1 to increase a driving torque, at the same time performs braking control on a left-front wheel of the four wheels, and at the same time performs determination of $T_{request}$ and $T_{brake-motor}$, to ensure that an active yaw moment generated from both driving and braking is M=−ΔM, to enable the electric vehicle to enter a stable state as soon as possible.

According to another embodiment of the present disclosure, as shown in FIG. 5, when the active safety controller 8 determines that the electric vehicle is in a left-turn oversteer state and rear wheels of the electric vehicle have a side slip, if the rear shaft slip angle is greater than the first preset angle and is less than or equal to the second preset angle, the active safety controller 8 controls a motor corresponding to a left-front wheel of the four wheels by using the motor controller 1 to increase a driving torque, to ensure that an active yaw moment generated from the increased driving torque is M=−ΔM, thereby improving a turning speed of the electric vehicle, and improving an operational stability characteristic of the electric vehicle; and if the rear shaft slip angle is greater than the second preset angle, the active safety controller 8 controls a motor corresponding to the left-front wheel by using the motor controller 1 to increase a driving torque, at the same time performs braking control on a right-front wheel of the four wheels, and at the same time performs determination of $T_{request}$ and $T_{brake-motor}$, to ensure that active yaw moment generated from both driving and braking is M=−ΔM, to enable the electric vehicle to enter a stable state as soon as possible.

When a difference between the actual yaw angular speed of the electric vehicle and the target yaw angular speed is greater than a preset difference threshold, but the rear shaft slip angle does not reach a preset angle threshold, it indicates that front wheels are in understeer state; when the rear shaft slip angle reaches the preset angle threshold, but the difference between the actual yaw angular speed of the electric vehicle and the target yaw angular speed does not reach the preset difference threshold, it indicates that rear wheels are in oversteer state. It may be determined whether the electric vehicle is left turning or right turning by determining whether the steering wheel rotation angle signal has a positive or negative value. Therefore, in this embodiment of the present disclosure, the active safety controller may determine a current steering state of the electric vehicle, for example, right-turn understeer, left-turn understeer, right-turn oversteer, and left-turn oversteer.

For the active safety control method of an electric vehicle according to this embodiment of the present disclosure, when an electric vehicle has a side slip and is about to enter a side slip limit interval, yaw control is performed on the electric vehicle driving torques of four motors, so that an attitude of the electric vehicle is corrected, a turning speed of the electric vehicle is improved, a decrease in a vehicle speed caused by braking is avoided, and operational stability of the electric vehicle is improved. When the electric vehicle is in the side slip limit interval, yaw control is performed on the electric vehicle by using the driving torques and feedback braking torques of the four motors and using braking torques of the four hydraulic brakes simultaneously, so that the electric vehicle enters a stable state more rapidly, safety of the electric vehicle is improved. When the motors have a limited feedback braking capability, combined control of braking torques of the hydraulic brakes and feedback braking torques of the motors may be used to rapidly perform compensation of hydraulic braking torques, thereby implementing a combined control function of the active safety controller, and expanding an application scope of the system. Therefore, not only a dynamic control problem of a vehicle body of an all-wheel drive electric automobile and a problem of a slow response speed that exists in a hydraulic electronic stability control system are resolved, but also the electric operational stability and safety of a vehicle may be greatly improved.

It may be understood that it represents that any process or method described in a flowchart or in another manner herein includes one or more modules, segments or parts that are configured to implement code of executable instructions of steps of specific logic functions or processes, and a scope of preferred implementation manners of the present disclosure includes other implementations. The functions may be executed in an order other than a described or discussed order, and the order includes a manner that involved functions are executed basically at the same time or a reverse order of the involved functions, which should be understood by a person skilled in the technical field of the embodiments of the present disclosure.

Logic and/or steps that are represented in a flowchart or described herein in another manner may be, for example, regarded as an ordered list of executable instructions used to implement logic functions, and may be specifically implemented in any computer readable medium, so that the executable instructions are used by instruction execution systems, apparatuses or devices (for example, a system based on a computer, a system including a processor or another system that can retrieve an instruction from the instruction execution systems, apparatuses or devices and executes the instruction), or are used in combination with these instruction execution systems, apparatuses or devices. As for this specification, the "computer readable medium" may be any apparatus that can include, store, communicate, propagate or transmit a program for use by the instruction execution systems, apparatuses or devices or use in combination with these instruction execution systems, apparatuses or devices. More specific examples (a nonexclusive list) of the computer readable medium include the following: an electrical connection portion (electronic apparatus) having one or more wires, a portable computer cassette (magnetic apparatus), a random access memory (RAM), a read-only memory (ROM), an erasable programmable read-only memory (EPROM or a flash memory), an optical fiber apparatus, and a portable compact disc read-only memory (CDROM). In addition, the computer readable medium may even be paper or another suitable medium on which the program is printed, because, for example, the paper or another medium may be scanned optically, editing, deciphering or processing in another suitable manner if necessary is then performed to obtain the program in an electronic manner, and the program is then stored in a computer memory.

It should be understood that parts of the present disclosure may be implemented by using hardware, software, firmware or a combination thereof. In the foregoing implementation manner, multiple steps or methods may be implemented by using software or firmware that is stored in a memory and is executed by a suitable instruction execution system. For example, when hardware is used for implementation, same as that in another implementation manner, any one or a combination of the following technologies well known to a person skilled in the art may be used for implementation: a discrete logic circuit having a logic gate circuit configured to implement a logic function on a data signal, a dedicated integrated circuit having a suitable combined logic gate circuit, a programmable gate array (PGA), a field programmable gate array (FPGA), and the like.

A person of ordinary skill in the art may understand that implementation of all or a part of steps carried in the method in the foregoing embodiment may be accomplished by a program instructing related hardware, where the program may be stored in a computer readable storage medium. When the program is executed, one or a combination of steps in the method embodiment is included.

In addition, functional units in the embodiments of the present disclosure may be integrated in one processing module, or the units may separately exist physically, or two or more units may be integrated in one module. The foregoing integrated modules may be implemented by using a form of hardware, or may be implemented by using a form of a software function module. If the integrated modules are implemented in the form of software function modules and are sold or used as independent products, the integrated modules may also be stored in a computer readable storage medium.

The storage medium mentioned in the foregoing may be a read-only memory, a magnetic disk, a compact disc or the like.

In the description of this specification, description with reference to the terms "one embodiment", "some embodiments", "an example", "a specific example", "some examples" or the like refers to that specific features, structures, materials or characteristics described with reference to the embodiments or examples are included in at least one embodiment or example of the present disclosure. In this specification, schematic description of the foregoing terms does not necessarily refer to the same embodiment or example. Moreover, the described specific features, structures, materials or characteristics may be combined in a suitable manner in any one or more embodiments or examples.

Although the embodiments of the present disclosure have been shown and described, for a person of ordinary skill in the art, it may be understood that various changes, modifications, replacements, and variations may be made to these embodiments without departing from the principle and spirit of the present disclosure, and the scope of the present disclosure is defined by the appended claims and equivalents thereof.

What is claimed is:

1. An active safety control system of an electric vehicle, comprising:
a wheel speed detection module, configured to detect a wheel speed of the electric vehicle to generate a wheel speed signal;
a steering wheel rotation angle sensor and a yaw rate sensor module, configured to detect state information of the electric vehicle;
a motor controller, configured to connect to four motors of the electric vehicle, respectively;
an active safety controller, configured to communicate with the motor controller mutually, to communicate with the steering wheel rotation angle sensor and the yaw rate sensor module, and to connect to each hydraulic brake of the electric vehicle, and receive the wheel speed signal sent by the wheel speed detection module and the state information of the electric vehicle sent by the steering wheel rotation angle sensor and the yaw rate sensor module, obtain state information of a battery pack of the electric vehicle and state information of the four motors, obtain a first side slip signal or a second side slip signal according to the wheel speed signal, the state information of the electric vehicle, the state information of the battery pack and the state information of the four motors, and control four hydraulic brakes of the electric vehicle and control the four motors by using the motor controller according to the first side slip signal or the second side slip signal, wherein the first side slip signal indicates that the electric vehicle has a side slip and is about to enter a side slip limit interval, and the second side slip signal indicates that the electric vehicle is in the side slip limit interval.

2. The active safety control system of an electric vehicle according to claim 1, wherein the active safety controller is further configured to: perform yaw control on the electric vehicle by using driving torques of the four motors according to the first side slip signal; and perform the yaw control on the electric vehicle by using the driving torques and feedback braking torques of the four motors and using braking torques of the four hydraulic brakes simultaneously according to the second side slip signal.

3. The active safety control system of an electric vehicle according to claim 1, wherein the wheel speed detection module comprises four wheel speed sensors and four rotary transformer sensors, wherein each wheel speed sensor is disposed corresponding to each wheel of the electric vehicle, and each rotary transformer sensor is disposed corresponding to each motor; and
the yaw rate sensor module comprises a yaw angular speed sensor, a vertical acceleration sensor, and a lateral acceleration sensor.

4. The active safety control system of an electric vehicle according to claim 3, wherein in a driving process of the electric vehicle, the active safety controller is further configured to:
calculate a target yaw angular speed of the electric vehicle according to a steering wheel rotation angle signal detected by the steering wheel rotation angle sensor, a vertical acceleration detected by the vertical acceleration sensor and the wheel speed signal;
compare the target yaw angular speed with an actual yaw angular speed of the electric vehicle detected by the yaw angular speed sensor to obtain a yaw angular speed difference $\Delta\psi'$;
calculate a rear shaft slip angle of the electric vehicle according to the wheel speed signal, the steering wheel rotation angle signal, the vertical acceleration, the actual yaw angular speed of the electric vehicle, and a lateral acceleration of the electric vehicle that is detected by the lateral acceleration sensor; and
obtain the first side slip signal when the yaw angular speed difference $\Delta\psi'$ is greater than a first preset angular speed and is less than or equal to a second preset angular speed, or when the rear shaft slip angle is greater than a first preset angle and is less than or equal to a second preset angle; and obtain the second side slip signal when the yaw angular speed difference $\Delta\psi'$ is greater than the second preset angular speed, or when the rear shaft slip angle is greater than the second preset angle.

5. The active safety control system of an electric vehicle according to claim 4, wherein the active safety controller is further configured to:
   calculate a yaw moment difference $\Delta M$ between a target yaw moment and an actual yaw moment of the electric vehicle according to the target yaw angular speed, the actual yaw angular speed of the electric vehicle, and an overall vehicle rotary inertia of the electric vehicle;
   when the yaw control is performed on the electric vehicle by using the driving torques of the four motors, perform calculation by using a preset overall vehicle dynamics model and a preset tire model according to driving torques of four wheels of the electric vehicle in a current state and the yaw moment difference $\Delta M$ to obtain a first opposite yaw moment, and perform the yaw control on the electric vehicle according to the first opposite yaw moment to calibrate an attitude of the electric vehicle; and
   when the yaw control is performed on the electric vehicle by using the driving torques and the feedback braking torques of the four motors and using braking torques of the four hydraulic brakes simultaneously, perform calculation by using the preset overall vehicle dynamics model and the preset tire model according to the driving torques of the four wheels, braking torques of the four wheels of the electric vehicle in the current state and the yaw moment difference $\Delta M$ to obtain a second opposite yaw moment and to enable the electric vehicle to enter a stable state;
   wherein braking torques of the four wheels at a moment are obtained according to feedback braking torques of the four motors at the moment and braking torques of the four hydraulic brakes at the moment, and driving torques of the four wheels at the moment are obtained according to driving torques of the four motors at the moment.

6. The active safety control system of an electric vehicle according to claim 5, wherein the active safety controller is further configured to:
   if a required braking torque of the yaw control is less than or equal to a braking torque formed by the feedback braking torques of the four motors, obtain the required braking torque by using the feedback braking torques of the four motors completely;
   if the required braking torque of the yaw control is greater than the braking torque formed by the feedback braking torques of the four motors, obtain the required braking torque by using the feedback braking torques of the four motors and using the braking torques of the four hydraulic brakes simultaneously.

7. The active safety control system of an electric vehicle according to claim 4, wherein when the electric vehicle is in a right-turn understeer state and front wheels of the electric vehicle have a side slip, the active safety controller is further configured to:
   if the yaw angular speed difference $\Delta\psi'$ is greater than the first preset angular speed and is less than or equal to the second preset angular speed, control a motor corresponding to a left-rear wheel of the four wheels by using the motor controller to increase a driving torque of the motor corresponding to the left-rear wheel; and
   if the yaw angular speed difference $\Delta\psi'$ is greater than the second preset angular speed, control the motor corresponding to the left-rear wheel by using the motor controller to increase the driving torque of the motor corresponding to the left-rear wheel, and simultaneously perform braking control on a right-rear wheel of the four wheels.

8. The active safety control system of an electric vehicle according to claim 4, wherein when the electric vehicle is in a left-turn understeer state and front wheels of the electric vehicle have a side slip, the active safety controller is further configured to:
   if the yaw angular speed difference $\Delta\psi'$ is greater than the first preset angular speed and is less than or equal to the second preset angular speed, control a motor corresponding to a right-rear wheel of the four wheels by using the motor controller to increase a driving torque of the motor corresponding to the right-rear wheel; and
   if the yaw angular speed difference $\Delta\psi'$ is greater than the second preset angular speed, control the motor corresponding to the right-rear wheel by using the motor controller to increase the driving torque of the motor corresponding to the right-rear wheel, and simultaneously perform braking control on a left-rear wheel of the four wheels.

9. The active safety control system of an electric vehicle according to claim 4, wherein when the electric vehicle is in a right-turn oversteer state and rear wheels of the electric vehicle have a side slip, the active safety controller is further configured to:
   if the rear shaft slip angle is greater than the first preset angle and is less than or equal to the second preset angle, control a motor corresponding to a right-front wheel of the four wheels by using the motor controller to increase a driving torque of the motor corresponding to the right-front wheel; and
   if the rear shaft slip angle is greater than the second preset angle, control the motor corresponding to the right-front wheel by using the motor controller to increase the driving torque of the motor corresponding to the right-front wheel, and simultaneously perform braking on a left-front wheel of the four wheels.

10. The active safety control system of an electric vehicle according to claim 4, wherein when the electric vehicle is in a left-turn oversteer state and rear wheels of the electric vehicle have a side slip, the active safety controller is further configured to:
    if the rear shaft slip angle is greater than the first preset angle and is less than or equal to the second preset angle, control a motor corresponding to a left-front wheel of the four wheels by using the motor controller to increase a driving torque of the motor corresponding to the left-front wheel; and
    if the rear shaft slip angle is greater than the second preset angle, control the motor corresponding to the left-front wheel by using the motor controller to increase the driving torque of the motor corresponding to the left-front wheel, and simultaneously perform braking on a right-front wheel of the four wheels.

11. An electric vehicle, comprising an active safety control system of an electric vehicle, comprising:
    a wheel speed detection module, configured to detect a wheel speed of the electric vehicle to generate a wheel speed signal;
    a steering wheel rotation angle sensor and a yaw rate sensor module, configured to detect state information of the electric vehicle;
    a motor controller, configured to connect to four motors of the electric vehicle, respectively;

an active safety controller, configured to communicate with the motor controller mutually, to communicate with the steering wheel rotation angle sensor and the yaw rate sensor module, and to connect to each hydraulic brake of the electric vehicle, and receive the wheel speed signal sent by the wheel speed detection module and the state information of the electric vehicle sent by the steering wheel rotation angle sensor and the yaw rate sensor module, obtain state information of a battery pack of the electric vehicle and state information of the four motors, obtain a first side slip signal or a second side slip signal according to the wheel speed signal, the state information of the electric vehicle, the state information of the battery pack and the state information of the four motors, and control four hydraulic brakes of the electric vehicle and control the four motors by using the motor controller according to the first side slip signal or the second side slip signal, wherein the first side slip signal indicates that the electric vehicle has a side slip and is about to enter a side slip limit interval, and the second side slip signal indicates that the electric vehicle is in the side slip limit interval.

12. An active safety control method of an electric vehicle, comprising following steps:
  detecting, by a wheel speed sensor, a wheel speed of the electric vehicle to generate a wheel speed signal,
  detecting, by a steering wheel rotation sensor and a yaw rate sensor, state information of the electric vehicle;
  acquiring, by a controller, state information of a battery pack of the electric vehicle and state information of four motors of the electric vehicle;
  obtaining a first side slip signal or a second side slip signal according to the wheel speed signal, the state information of the electric vehicle, the state information of the battery pack and the state information of the four motors, wherein the first side slip signal indicates that the electric vehicle has a side slip and is about to enter a side slip limit interval, and the second side slip signal indicates that the electric vehicle is in the side slip limit interval; and
  according to the first side slip signal or the second side slip signal, controlling four hydraulic brakes of the electric vehicle, and controlling the four motors by using a motor controller.

13. The active safety control method of an electric vehicle according to claim 12, wherein the step of according to the first side slip signal or the second side slip signal, controlling four hydraulic brakes, and controlling the four motors by using a motor controller comprises:
  according to the first side slip signal, performing yaw control on the electric vehicle by using driving torques of the four motors; according to the second side slip signal, performing the yaw control on the electric vehicle by using the driving torques and feedback braking torques of the four motors and using braking torques of the four hydraulic brakes simultaneously.

14. The active safety control method of an electric vehicle according to claim 13, wherein the state information of the electric vehicle comprises a steering wheel rotation angle signal, an actual yaw angular speed of the electric vehicle, and a lateral acceleration and a vertical acceleration of the electric vehicle; and
  the step of obtaining a first side slip signal or a second side slip signal according to the wheel speed signal, the state information of the electric vehicle, the state information of the battery pack, and the state information of the four motors comprises:
    calculating a target yaw angular speed of the electric vehicle according to the steering wheel rotation angle signal, the vertical acceleration and the wheel speed signal; and
    comparing the target yaw angular speed with the actual yaw angular speed of the electric vehicle to obtain a yaw angular speed difference $\Delta\psi'$;
    calculating a rear shaft slip angle of the electric vehicle according to the wheel speed signal, the steering wheel rotation angle signal, the vertical acceleration, the actual yaw angular speed of the electric vehicle, and the lateral acceleration of the electric vehicle;
    obtaining the first side slip signal if the yaw angular speed difference $\Delta\psi'$ is greater than a first preset angular speed and is less than or equal to a second preset angular speed, or if the rear shaft slip angle is greater than a first preset angle and is less than or equal to a second preset angle; and
    obtaining the second side slip signal if the yaw angular speed difference $\Delta\psi'$ is greater than the second preset angular speed, or if the rear shaft slip angle is greater than the second preset angle.

15. The active safety control method of an electric vehicle according to claim 14, further comprising: calculating a yaw moment difference $\Delta M$ between a target yaw moment and an actual yaw moment of the electric vehicle according to the target yaw angular speed, the actual yaw angular speed of the electric vehicle, and an overall vehicle rotary inertia of the electric vehicle; wherein,
  performing yaw control on the electric vehicle by using driving torques of the four motors comprises: performing calculation by using a preset overall vehicle dynamics model and a preset tire model and according to driving torques of four wheels of the electric vehicle in a current state and the yaw moment difference $\Delta M$ to obtain a first opposite yaw moment, and performing the yaw control on the electric vehicle according to the first opposite yaw moment to calibrate an attitude of the electric vehicle; and
  performing yaw control on the electric vehicle by using the driving torques and the feedback braking torques of the four motors and using braking torques of the four hydraulic brakes simultaneously comprises: performing calculation by using the preset overall vehicle dynamics model and the preset tire model and according to the driving torques of the four wheels and braking torques of the four wheels of the electric vehicle in the current state and the yaw moment difference $\Delta M$ to obtain a second opposite yaw moment and to enable the electric vehicle to enter a stable state;
  wherein the braking torques of the four wheels at a moment are obtained according to the feedback braking torques of the four motors at the moment and the braking torques of the four hydraulic brakes at the moment, and the driving torques of the four wheels at the moment are obtained according to the driving torques of the four motors at the moment.

16. The active safety control method of an electric vehicle according to claim 15, wherein when performing the yaw control on the electric vehicle by using the driving torques and feedback braking torques of the four motors and using braking torques of the four hydraulic brakes simultaneously,
  if a required braking torque of the yaw control is less than or equal to a braking torque formed by the feedback braking torques of the four motors, the required braking torque is obtained by using the feedback braking torques of the four motors completely; and if the required braking torque is greater than the braking torque formed by the feedback braking torques of the four motors, the required braking torque is obtained by using the feedback braking torques of the four motors and using the braking torques of the four hydraulic brakes simultaneously.

17. The active safety control method of an electric vehicle according to claim 14, wherein, when the electric vehicle is in a right-turn understeer state and front wheels of the electric vehicle have a side slip,
  performing yaw control on the electric vehicle by using driving torques of the four motors comprises: if the yaw angular speed difference $\Delta\psi'$ is greater than the first preset angular speed and is less than or equal to the second preset angular speed, controlling a motor corresponding to a left-rear wheel of the four wheels by using the motor controller to increase a driving torque of the motor corresponding to the left-rear wheel; and
  performing the yaw control on the electric vehicle by using the driving torques and feedback braking torques of the four motors comprises: if the yaw angular speed difference $\Delta\psi'$ is greater than the second preset angular speed, controlling the motor corresponding to the left-rear wheel by using the motor controller to increase the driving torque of the motor corresponding to the left-rear wheel, and simultaneously performing braking control on a right-rear wheel of the four wheels.

18. The active safety control method of an electric vehicle according to claim 14, wherein, when the electric vehicle is in a left-turn understeer state and front wheels of the electric vehicle have a side slip,
  performing yaw control on the electric vehicle by using driving torques of the four motors comprises: if the yaw angular speed difference $\Delta\psi'$ is greater than the first preset angular speed and is less than or equal to the second preset angular speed, controlling a motor corresponding to a right-rear wheel of the four wheels by using the motor controller to increase a driving torque of the motor corresponding to the right-rear wheel; and
  performing the yaw control on the electric vehicle by using the driving torques and feedback braking torques of the four motors comprises: if the yaw angular speed difference $\Delta\psi'$ is greater than the second preset angular speed, controlling the motor corresponding to the right-rear wheel by using the motor controller to increase the driving torque of the motor corresponding to the right-rear wheel, and simultaneously performing braking control on a left-rear wheel of the four wheels.

19. The active safety control method of an electric vehicle according to claim 14, wherein, when the electric vehicle is in a right-turn oversteer state and rear wheels of the electric vehicle have a side slip,
  performing yaw control on the electric vehicle by using driving torques of the four motors comprises: if the rear shaft slip angle is greater than the first preset angle and is less than or equal to the second preset angle, controlling a motor corresponding to a right-front wheel of the four wheels by using the motor controller to increase a driving torque of the motor corresponding to the right-front wheel; and
  performing the yaw control on the electric vehicle by using the driving torques and feedback braking torques of the four motors comprises: if the rear shaft slip angle is greater than the second preset angle, controlling the motor corresponding to the right-front wheel by using the motor controller to increase the driving torque of the motor corresponding to the right-front wheel, and simultaneously performing braking on a left-front wheel of the four wheels.

20. The active safety control method of an electric vehicle according to claim 14, wherein, when the electric vehicle is in a left-turn oversteer state and rear wheels of the electric vehicle have a side slip,
  performing yaw control on the electric vehicle by using driving torques of the four motors comprises: if the rear shaft slip angle is greater than the first preset angle and is less than or equal to the second preset angle, controlling a motor corresponding to a left-front wheel of the four wheels by using the motor controller to increase a driving torque of the motor corresponding to the left-front wheel; and
  performing the yaw control on the electric vehicle by using the driving torques and feedback braking torques of the four motors comprises: if the rear shaft slip angle is greater than the second preset angle, controlling the motor corresponding to the left-front wheel by using the motor controller to increase the driving torque of the motor corresponding to the left-front wheel, and simultaneously performing braking on a right-front wheel of the four wheels.

* * * * *